United States Patent [19]
Sato et al.

[11] Patent Number: 5,882,705
[45] Date of Patent: Mar. 16, 1999

[54] MICELLAR WHEY PROTEIN, SOLUTION THEREOF, POWDER THEREOF, AND FOODS UTILIZING SAME

[75] Inventors: Kaoru Sato, Kamifukuoka; Michiko Nakamura, Omiya; Tsuguaki Nishiya, Sayama, all of Japan

[73] Assignee: Snow Brand Milk Products Co., Ltd, Hokkaido, Japan

[21] Appl. No.: 887,334

[22] Filed: Jul. 2, 1997

Related U.S. Application Data

[63] Continuation of Ser. No. 682,392, Jul. 17, 1996, abandoned, which is a continuation of Ser. No. 278,960, Jul. 22, 1994, abandoned.

[30] Foreign Application Priority Data

Sep. 7, 1993 [JP] Japan .................................. 5-246167

[51] Int. Cl.$^6$ ........................................................ A23C 9/12
[52] U.S. Cl. ............................ 426/41; 426/583; 426/657
[58] Field of Search .............................. 426/34, 41, 580, 426/583, 656, 657

[56] References Cited

U.S. PATENT DOCUMENTS

| | | | |
|---|---|---|---|
| 2,585,951 | 2/1952 | Malkames, Jr. ........................... | 426/41 |
| 3,857,966 | 12/1974 | Feldman et al. ........................... | 426/7 |
| 4,107,334 | 8/1978 | Jolly ........................................ | 426/7 |
| 4,200,662 | 4/1980 | Scibelli ................................... | 426/583 |
| 4,847,096 | 7/1989 | Mellqvist et al. ......................... | 426/41 |
| 4,981,704 | 1/1991 | Thibault .................................. | 426/41 |
| 5,039,532 | 8/1991 | Jost et al. ................................. | 426/41 |
| 5,217,741 | 6/1993 | Kawachi et al. ......................... | 426/573 |

FOREIGN PATENT DOCUMENTS

| | | |
|---|---|---|
| 61-233 | 1/1986 | Japan . |
| 5103595 | 4/1993 | Japan . |

OTHER PUBLICATIONS

Mulvihill et al: "Gelation Characteristics of Whey Proteins and γ-Lactoglobulin", Food Technology—Sep. 1987 pp. 102–111.

Schmidt et al: "Multiple Regression and Response Surface Analysis of the Effects of Calcium Chloride and Cysteine on Heat–Induced Whey Protein Gelation", J. Agric. Food Chem. vol. 27, No. 3, (1979)—pp. 529–532.

De Wit: "The Use of Whey Protein Products", Developments in Dairy Whemistry—4, Chapter 8, pp. 323–344.

*Primary Examiner*—Leslie Wong
*Attorney, Agent, or Firm*—Pillsbury Madison & Sutro LLP

[57] ABSTRACT

Micellar whey protein obtained by the heat treatment of whey protein having undergone limited hydrolysis by a proteolytic enzyme and containing whey protein molecules having a micellar structure similar to that of casein micelles, the micellar whey protein being characterized in that:

(1) the molecules are in the form of micelles of irregular shape having a molecular weight of not less than 1,000,000 and a molecular size of 30 to 500 nm;

(2) the micellar whey protein is soluble in water and gives a milk-white solution; and (3) the micelles associate together in a solution having a pH in the acid range of 3 to 6 to form insoluble aggregates.

This micellar whey protein is so stable that it does not undergo gelation even when heated in solution, and can hence be widely utilized in liquid drink compositions, processed foods and the like.

13 Claims, 2 Drawing Sheets

MICELLAR WHEY PROTEIN, SOLUTION THEREOF, POWDER THEREOF, AND FOODS UTILIZING SAME

This is a continuation of application Ser. No. 08/682,392, filed on Jul. 17, 1996, now abandoned, and which was a continuation of application No. Ser. 08/278,960 filed Jul. 22, 1994, now abandoned.

BACKGROUND OF THE INVENTION

1. Field of the Invention

This invention relates to micellar whey protein comprising casein micelle-like molecular aggregates formed by association. More particularly, this invention relates to micellar whey protein characterized in that it has excellent thermal stability and high solubility and a solution thereof forms a coagulum in the acid pH range without application of heat, a solution containing it, and a powder and coagulum obtained therefrom. They can be widely utilized as food materials. This invention also relates to foods utilizing the protein.

2. Description of the Prior Art

Whey protein is generally defined as milk protein exhibiting water solubility under acidic conditions, and is obtained as a by-product chiefly in the process of manufacturing cheese and casein. In spite of its high nutritive value, whey protein has not been fully utilized in the food industry and most of it is discarded by reason of the fact that it requires heating for purpose of gelation as described later (on the contrary, undesired gelation occurs as a result of heat sterilization or the like). Accordingly, it is very important from the viewpoint of environmental protection and effective utilization of resources to promote the use of whey protein as a food material. Generally, whey protein is denatured by heating to 60° C. or above and undergoes gelation easily under certain conditions, for example, when heated at a pH of 6 or less [Mulvihill, D. M. and Kinsella, J. E. (1987) Food Technol., 41(9), 102–111] and when heated in the presence of a salt [Schmidt, R. H., Illingworth, B. L., Deng, J. C. and Cornell, J. A. (1979) J. Agric. Food Chem., 27(3), 529]. Such gelation is believed to take place because the higher-order structure of the protein changes in consequence of denaturation by heating, and the resulting increase of hydrophobic regions and of the reactivity of disulfide bonds causes the protein molecules to form a three-dimensional network structure.

Since whey protein has high nutritive value, it is used as a material for highly nutritious foods such as powdered milk for infants. Moreover, since whey protein has various functional properties (e.g., binding and emulsifying properties) in addition to the above-described heat-gelling properties, it is also utilized as a meat binder, fat substitute and the like [Morr, C. V. (1989) in Developments in Dairy Chemistry, P. F. Fox (ed.), Vol. 4, p. 323, Elsevier Applied Sci., New York]. Thus, the utilization of whey protein for various purposes has been attempted. However, whey protein requires heat treatment for purposes of gelation and has to be heated under static conditions. Consequently, it is not practical to manufacture a large amount of gel on an industrial scale. Moreover, a long time is required to cause gelation of the central part as a result of heat transfer from the periphery, which may result in scorching or pore formation due to overheating. Furthermore, the utilization of whey protein is also limited by the fact that it cannot be used in non-heat-processed foods. When whey protein is used in drinks and other foods in which gelation should be inhibited, the whey protein may be aggregated as a result of heat sterilization or the like. This makes it difficult to apply whey protein to drinks and the like. Owing to these problems, whey protein is still used only as a supplemental material in a limited field of food processing.

Accordingly, there has been developed a whey-protein-containing solution which does not require heat treatment for purposes of gelation but undergoes gelation by the action of monovalent or divalent salt-derived ions (U.S. Pat. No. 5,217,741). This solution is obtained by heating a whey protein solution having a low salt-derived ion concentration as defined by an ash content of not greater than 1% to increase the degree of hydrophobicity of the whey protein. The salt-induced gel obtained by the addition of salt-derived ions to the solution is a smooth and transparent gel having excellent water-holding properties and enables whey protein to be applied to non-heat-processed foods. However, since this gel is induced by the addition of salt-derived ions, a taste arising from the salt is left. Moreover, the powder obtained by drying the heated whey protein solution shows a marked reduction in processability because its solubility is very low.

SUMMARY OF THE INVENTION

The present invention has been made in view of the above-described actual situation of the prior art. An object thereof is to provide novel whey protein having unique properties quite different from those of common whey protein forming a heat-induced gel, the above-described whey protein forming a transparent and smooth gel induced by salt-derived ions, and the like, the novel whey protein being characterized in that, as a result of the construction of a casein micelle-like molecular form which is stable in the neutral pH range but loses stability in a specific acid pH range to form insoluble aggregates, the whey protein has excellent thermal stability and high solubility and a solution thereof yields a non-heated coagulum in the acid pH range.

Another object of the present invention is to utilize such whey protein in the form of a solution, utilize it in powder form, and utilize a whey protein coagulum obtained therefrom and having the above-described properties.

A further object of the present invention is to provide foods using such whey protein as a food additive.

In order to accomplish these objects, the present invention provides micellar whey protein obtained by the heat treatment of whey protein having undergone limited hydrolysis by a proteolytic enzyme, the micellar whey protein being characterized in that:

(1) the molecules are in the form of micelles of irregular shape having a molecular weight of not less than 1,000,000 and a molecular size of 30 to 500 nm;

(2) the micellar whey protein is soluble in water and gives a milk-white solution; and (3) the micelles associate together in a solution having a pH in the acid range of 3 to 6 to form insoluble aggregates.

Since the whey protein molecules have a micellar structure similar to that of casein micelles, this micellar whey protein does not undergo gelation even when heated in solution. Moreover, this micellar whey protein can be endowed with the property of losing stability to coagulate in a specific acid pH range. Thus, this micellar whey protein can be widely utilized as a sterilized non-gel food, as a non-heating coagulant, and as a material for various foods (e.g., dairy products such as cheese, yogurt and ice cream) in the form of a coagulum as such. In a preferred embodiment, the above-described limited hydrolysis by a proteolytic enzyme is carried out until the degree of proteolysis is in the range of 0.01 to 50%, and the heat treatment is carried out at a temperature of 60° C. or above.

The present invention also provides a micellar whey protein solution containing 0.05 to 30% by weight of the above-described micellar whey protein. Since a solution containing the micellar whey protein in the specified amount has excellent thermal stability and does not undergo gelation, it can be utilized as a drink or the like and, moreover, can also be used directly as a food material in various applications. Furthermore, since the whey protein molecules in the solution form micelles having a high molecular weight, they can be separated from low-molecular-weight substances such as lactose and the like, for example, by means of a membrane having a fractionating molecular weight of 5,000 Da or more, thus making it possible to purify and concentrate the solution efficiently.

In addition, the present invention also provides a micellar whey protein powder obtained by drying the above-described micellar whey protein solution. Since the micellar whey protein has excellent thermal stability, a powder having good keeping quality can readily be obtained by freeze-drying or spray-drying a solution thereof. Moreover, this powder does not show a loss of solubility when redissolved, and can hence be used as a non-heating coagulant having the above-described properties, a powdered drink, and the like.

The above-described micellar whey protein has not been known in the past. That is, there has been no report that whey protein forms a micellar structure similar to that of casein micelles. As a result of intensive investigations conducted to derive new properties from whey protein, the present inventors have found that a stable micelle solution which does not undergo gelation on heating can be obtained by adding a proteolytic enzyme to a whey-protein-containing solution and then heat-treating this mixture. The present invention has been completed on the basis of this finding.

BRIEF DESCRIPTION OF THE DRAWINGS

FIGS. 2a–2c illustrate unheated WPI (50,000×magnification), whey micelles in accordance with the present invention (50,000× magnification) and whey micelles in accordance with the present invention (12,000×magnification), respectively.

DETAILED DESCRIPTION AND THE PREFERRED EMBODIMENTS

Figure 2A:
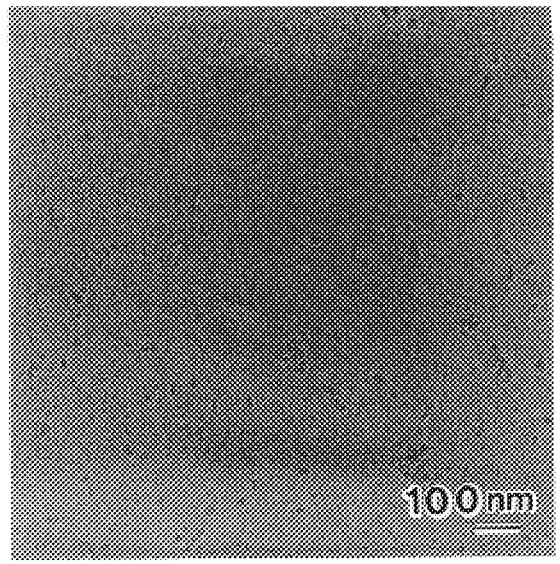
FIGS. 2a–2c are electron micrographs showing the particle structure of whey protein in solution.
Figure 2B:
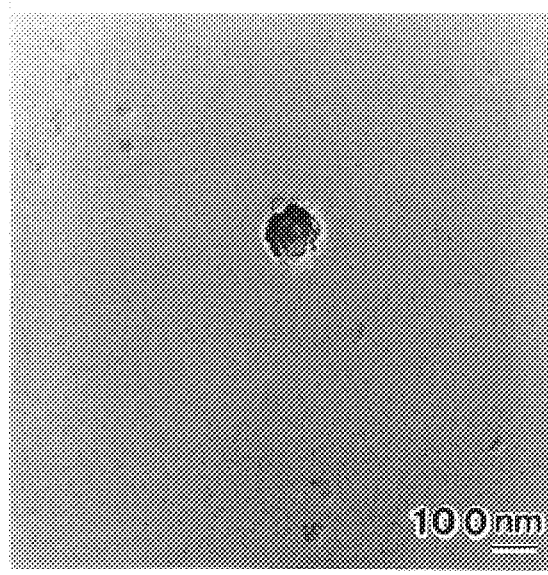
Figure 2C:
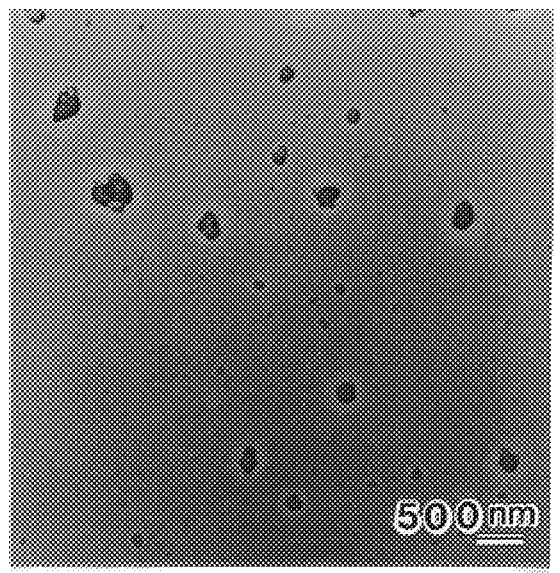

The micellar whey protein of the present invention (hereinafter referred to as "whey micelles") is characterized by having a micellar structure similar to that of casein micelles. In the present invention, the term "micellar" simply means that the whey protein molecules associate together to form particles of irregular shape in external appearance, and does not give any particular definition to the internal structure of the particles, or the like. FIGS. 2a–2c are electron micrographs showing the particle structure of whey protein. Specifically, FIG. 2a (50,000×magnification) illustrates conventional unheated WPI (whey protein isolate), and FIGS. 2b (50,000×magnification) and 2c (12,000×magnification) illustrate whey micelles in accordance with the present invention (as prepared in Example 1 that will be given later). In the case of the unheated WPI, the whey protein molecules are dispersed in the solution as very fine particles because they are not associated. In the case of the whey micelles, however, the whey protein molecules associate together to form aggregates of irregular shape. The size of these micelle particles is of the order of 30 to 500 nm and preferably 50 to 300 nm. These whey micelles are stably dispersed in the solvent to give a milk-white solution. This micelle solution is very stable in that no precipitate is formed on heating. In contrast, the unheated WPI solution has the property of being denatured and coagulated by heating, and forms an egg white-like gel under properly chosen conditions.

The micelle solution is stable when the whey micelle concentration in the solution is not greater than 30% by weight, the pH of the solution is in the range of 6 to 10 and preferably about 6 to 8, and the salt-derived ion content as expressed in terms of ash content is not greater than about 0.5%, so that the solution does not lose stability even if it is subjected to heat sterilization or the like. If the whey micelle concentration exceeds 30% by weight, the viscosity of the solution may increase to such an extent that it becomes difficult to handle. Moreover, if the pH of the solution is in the acid range of 6 or less (e.g., in the range of 3 to 6), the whey micelles will lose stability and tend to associate together to form insoluble aggregates. Furthermore, if the salt-derived ion content as expressed in terms of ash content exceeds 0.5%, the whey micelles will tend to form a coagulum.

Figure 1:
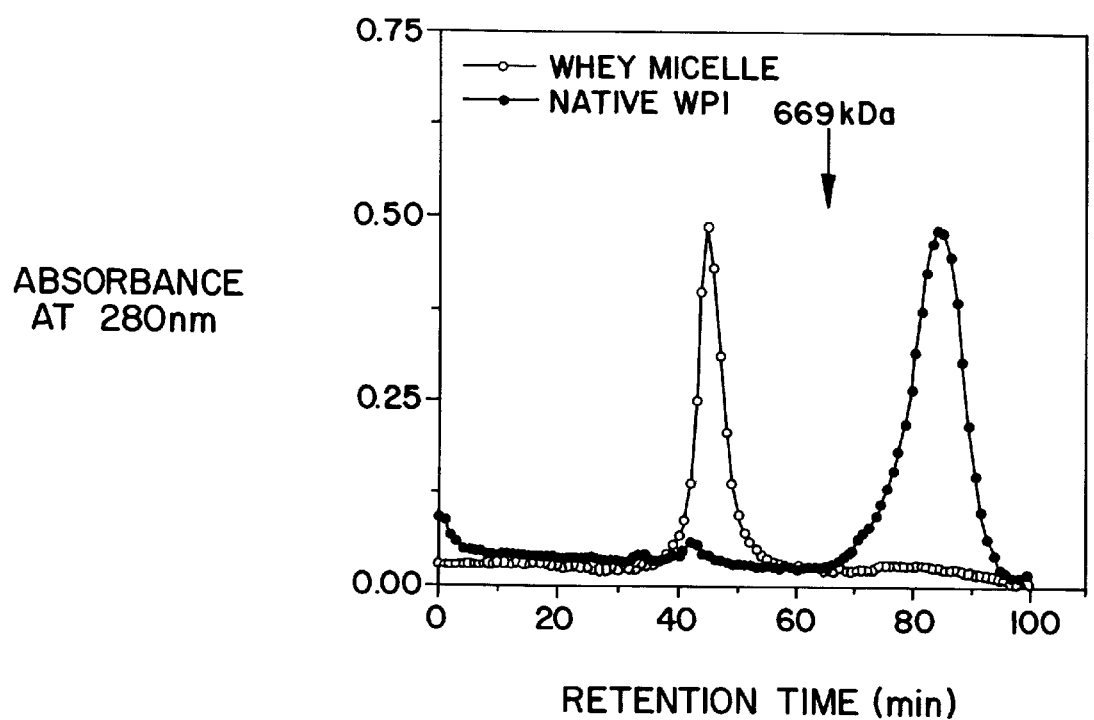
FIG. 1 shows the gel filtration patterns of a micellar whey protein solution in accordance with the present invention and of an unheated WPI solution.

The whey micelles have a molecular weight of not less than 1,000,000. FIG. 1 shows the gel filtration patterns of a whey micelle solution (as prepared in Example 1) and an unheated WPI solution. As can be seen from this figure, the whey protein in the unheated WPI consists mainly of components having a molecular weight of not greater than 30,000, such as β-lactoglobulin and α-lactalbumin, whereas the whey micelles have a molecular weight of as high as 1,000,000 or greater.

While the conventional heat-induced gel and salt-derived ion-induced gel are highly transparent and have a firm texture similar to that of egg white gel, whereas a coagulum obtained from the whey micelle solution of the present invention assumes a opaque-white color, has adhesion properties, and exhibits a soft and smooth texture.

Moreover, the whey micelle solution can be converted into powder by freeze drying or spray drying. The powder so prepared can be dispersed again in water to form a satisfactory micelle solution. Thus, the whey micelle solution of the present invention is characterized in that its keeping quality and handleability can be improved.

Now, the method for preparing the whey micelles of the present invention is described below.

The whey protein material used as the starting material in the present invention is cow's milk or a whey-protein-containing solution obtained in the process of manufacturing butter, cheese and the like. The whey protein present therein consists mainly of α-lactalbumin and β-lactoglobulin. In addition, whey protein concentrate (WPC), whey protein isolate (WPI) and the like are being widely supplied in powder form and are suitable for use as the starting material in the present invention because they are readily available and easy to handle. However, it is to be understood that the present invention is not limited to the use thereof. Among others, whey protein materials having a protein content (as whey protein) of not less than 60% by weight and an ash content of not greater than 5% by weight (on a solid basis) are preferred. However, even a whey protein material having a higher ash content can be used without difficulty if a solution prepared therefrom is desalted by electrodialysis or the like according to the need.

In order to prepare the whey micelles, the whey protein concentration should be in the range of about 0.05 to 30% by weight and preferably 1 to 10% by weight. If the whey protein concentration is less than 0.05% by weight, the amount of whey micelles obtained by heating in the presence of an enzyme will be so small that the effects of the present invention cannot be fully achieved. If it is greater than 30% by weight, the viscosity of the solution will increase to such an extent that its mixing and stirring operations becomes impracticably difficult. Besides, the pH of the solution should be in the range of 6 to 10 and preferably about 6 to 8, and the ash content of the solution should be not greater than about 0.5% by weight and preferably not greater than 0.1% by weight. This serves to inhibit aggregation reaction and thereby prepare a stable micelle solution.

Next, the whey protein is hydrolyzed by adding a proteolytic enzyme to the above-described solution. No particular limitation is placed on the type of proteolytic enzyme used for this purpose and there may be used any of various proteolytic enzymes originating from animals, vegetables and microorganisms. Specific examples thereof include trypsin, chymotrypsin, papain, chymopapain, collagenase, kallikrein, metallocene peptidase, actinase, pronase, proteinases A and K, various aminopeptidases, plasmin, acrosin, elastase, cathepsin, ficin, bromelain and chymosin. It is preferable to use an enzyme having a protease activity of not less than 1,000 U/g. Although a whey micelle solution can be obtained by using one of the above-enumerated enzymes, treatment with a combination of two or more different enzymes (e.g., trypsin-papain, pronase-bromelain or proteinase A-actinase) will be more effective.

The reaction is carried out by adding one or at least two of the above-enumerated enzymes to the whey-protein-containing solution, usually in an amount of 0.001 to 0.1% by weight based on the whey protein present therein, and incubating this mixture preferably at a temperature of 10° to 70° C. The amount of enzyme(s) used is regulated according to the specific activity of the enzyme and the amount of the whey protein. Temperatures lower than 10° C. are not suitable because the enzymatic reaction proceeds so slowly that the formation of a whey micelle solution is retarded. On the other hand, temperatures higher than 70° C. should be avoided because most of the enzyme or enzymes are inactivated. Although the reaction time may vary according to the type, amount and specific activity of the enzyme(s) added, the reaction should always be carried out to such an extent that the degree of proteolysis as defined by the following equation (1) is in the range of 0.01 to 50%. Usually, the reaction time ranges from about 10 minutes to about 5 hours.

$$\text{Degree of proteolysis (\%)} = [(A-A_0)/(A_{TOTAL}-A_0)] \times 100 \quad (1)$$

where A:
the amount of amino acids present in the supernatant obtained by adding 20% of trichloroacetic acid to the whey-protein-containing solution treated with a proteolytic enzyme so as to precipitate the protein.

$A_{TOTAL}$: the total amount of amino acids present in the whey-protein-containing solution.

$A_0$: the amount of amino acids present in the supernatant obtained by adding a previously inactivated enzyme to the whey-protein-containing solution and then adding 20% of trichloroacetic acid thereto so as to precipitate the protein.

After the whey protein has undergone limited hydrolysis by the enzyme, the solution is subjected to a heat treatment. This heat treatment serves to promote the formation of micelles by causing the whey protein molecules having undergone limited hydrolysis by the enzyme to associate together, and also to stop the hydrolysis reaction by inactivating the enzyme. If the degree of proteolysis is less than 0.01%, it will be difficult to form whey micelles by the heat treatment. If the degree of proteolysis is greater than 50%, the heat treatment will yield a gel or a clear solution instead of a micelle solution. Moreover, if the degree of proteolysis is greater than 50%, an undesirable bitter taste arising from peptides or amino acids will be produced. Preferably, the degree of proteolysis is in the range of 0.1 to 30%.

The heat treatment should be carried out at a temperature of 60° C. or above and preferably 60° to 150° C. If the temperature is lower than 60° C., a part of the enzyme used may not be inactivated. If the temperature is higher than 150° C., a severe discoloration or scorching will result. Heat treatment at the above-defined temperature causes whey micelle molecules to be formed instantaneously. The resulting whey micelle solution is thermally stable, so that any prolonged heat treatment will cause no further precipitation thereof. Usually, the heat-treating time ranges from about 1 second to about 6 hours.

According to the present invention, a thermally stable whey micelle solution can be prepared by treating a solution containing whey protein as the principal component with a proteolytic enzyme and heat-treating the solution as soon as the degree of proteolysis reaches 0.01 to 50%. Since the protein molecules in the whey micelle solution are in the form of micelles having a high molecular weight, it can be concentrated by means of a membrane having a fractionating molecular weight of not less than 5,000 Da to obtain a purified whey micelle solution. Thus, the whey protein can readily be separated from low-molecular-weight substances such as lactose. Moreover, since the whey micelle solution has such stability to heat that it can withstand sterilization without forming any insoluble aggregates, the whey micelle solution can be utilized as a liquid drink composition having a whey micelle concentration of 1 to 10%, either alone or in admixture with various food materials (such as seasonings, colorants, perfumes, fruit juices, milk-based drinks, vitamins and minerals) used in such an amount not to inhibit the functionality of the micelles [generally in the range of about 0.01 to 200% (on a dry basis) based on the whey protein]. Furthermore, a powdered drink composition can also be obtained by adding an excipient (such as a sugar or lipid) to the liquid drink composition according to the need and subjecting this mixture to freeze-drying or spray drying. This powdered drink composition retains high solubility and can be redissolved in water without forming any insoluble matter. Thus, the whey micelles can be handled in powder form, so that an improvement in keeping quality and handleability is achieved to a great economic advantage.

Furthermore, the whey micelles of the present invention can be widely utilized as a food material. Since a whey protein coagulum can be obtained by adjusting the whey micelle solution or a reconstituted solution of the whey micelle powder to a pH of 3 to 6, it is possible to prepare dairy products (such as cheese, yogurt and ice cream) based on the coagulum. Similarly, since a whey protein coagulum can be obtained by adding 0.01 to 1.0% of a neutral salt (such as sodium chloride or calcium chloride) to the whey micelle solution or a reconstituted solution of the whey micelle powder to a pH of 3 to 6, it is also possible to prepare dairy products (such as cheese, yogurt, ice cream and custard pudding) based on the coagulum. In order to form a coagulum of whey micelles, the whey micelle solution should generally have a whey micelle concentration of 1 to 15%, and its whey micelle concentration may be suitably regulated according to the gel strength of the desired final product, and the like.

Furthermore, the whey micelle solution, the whey micelle powder, or a reconstituted solution of the whey micelle powder can be used in both heat-processed foods and non-heat-processed foods, as a binder, extender, water dissociation-preventing agent, emulsion stabilizer or coagulant, in order to produce bean curd, boiled fish paste, ham, sausage and the like. In addition, the whey micelles of the present invention can be used to prepare W/O and O/W emulsions, and can further be used to develop entirely new types of foods.

The present invention is further illustrated by the following examples. However, these examples are not to be construed to limit the scope of the invention.

EXAMPLE 1

Eighty grams of WPI [Bipro, a product of Bio-Isolates Ltd.; protein content 97% (on a dry basis), ash content 2% (on a solid basis), pH 7] was dissolved in desalted water to make a total weight of 1,000 g. To this solution was added 0.1 g of pronase (a product of Kaken Chemicals Co., Ltd.; protease activity $7.5 \times 10^5$ U/g). The resulting mixture was stirred at 37° C. for an hour. The degree of proteolysis was 20%. Then, this mixture was heated in a water bath at 85° C. for 30 minutes to obtain a whey micelle solution. This heat treatment inactivated the pronase completely and the resulting whey micelle solution assumed a milk-white color and remained in a stable micellar state without forming any insoluble aggregates.

When the whey micelle solution thus obtained was sterilized by heating at 90° C. for 30 minutes, the micellar state was maintained and further storage at 5° C. for 3 months caused no detectable change. Then, this whey micelle solution was adjusted to pH 4.8 and allowed to stand at room temperature. The aggregation of micelles began at once to form a white, opaque insoluble coagulum.

FIG. 1 shows the gel filtration patterns of the whey micelle solution and the unheated WPI solution, indicating that the whey micelles are composed of associated molecular aggregates having a molecular weight of not less than 1,000,000. FIG. 2a is an electron micrograph of the unheated WPI, and FIGS. 2b and 2c are electron micrographs of the whey micelles. The unheated WPI consisted mostly of particles having a size of the order of several nanometers, whereas most of the whey micelles were molecular aggregates of irregular shape having a size of 30 to 500 nm.

EXAMPLE 2

A cheese whey solution obtained from a production process of Gouda cheese was concentrated by means of an ultrafiltration membrane having a fractionating molecular weight of 50,000 Da so as to give a protein content of 6%, and then desalted to obtain 2,500 g of a concentrated cheese whey solution (ash content 0.3%). After the pH of this concentrated cheese whey solution was adjusted to 6.8, 0.6 g of trypsin (a product of Sigma; protease activity $1.44 \times 10^6$ U/g) thereto and this mixture was reacted at 30° C. for 2 hours. Then, this mixture was heated at 95° C. for 10 minutes to prepare a whey micelle solution. The degree of hydrolysis of the whey protein by trypsin was 15%. This whey micelle solution assumed a milk-white color and remained in a stable micellar state without forming any insoluble aggregates. When the whey micelle solution thus obtained was sterilized at 90° C. for 30 minutes, the micellar state was maintained and further storage at 5° C. for 3 months caused no detectable change in the whey micelle solution. When this whey micelle solution was adjusted to pH 5.2, insoluble aggregates were formed and little protein was detected in the supernatant.

EXAMPLE 3

Nine volumes of the same whey micelle solution as that obtained Example 2 was mixed with 1 volume of butter oil previously melted at 60° C., and this mixture was emulsified in a TK homomixer (a product of Tokushu Kika Kogyo) at 3,000 rpm for 10 minutes. The resulting emulsion was concentrated in vacuo until the solid content reached 45–55%, and then spray-dried at an atomizing gas temperature of 170° C. When the whey micelle powder thus obtained was redissolved in water, the resulting solution resumed a micellar state and contained little insoluble matter.

EXAMPLE 4

In the same whey micelle solution as that obtained Example 2, lactose and sucrose were dissolved so as to give concentrations of 6% and 3%, respectively. After the total solid content was adjusted to 14%, the solution was inoculated with *Lactobacillus delbrueckii* subsp. *bulgaricus* and fermented at 41° C. for 4 hours. As a result, the whey micelles were coagulated to form a yogurt-like dairy product (pH 4.2). This product had a tasty flavor and was pleasant to the palate.

EXAMPLE 5

In the same whey micelle solution as that obtained Example 2, lactose was dissolved so as to give a concentration of 5%. After 3% of cream was added thereto, this mixture was emulsified in a high-pressure homogenizer having a pressure of 150 kg/cm$^2$. After 0.1% of calcium chloride was added thereto as a neutral salt, the emulsion was stirred and allowed to stand at 38° C. for 6 hours. As a result, the whey micelles were coagulated to form a bean curd-like product. This product had a tasty flavor and was pleasant to the palate.

What is claimed is:

1. A micellar whey protein product comprising the following properties:

(1) being obtained by heat treatment of whey protein solution, wherein the whey protein is thermally undenatured, the pH of the solution is in the range of 6 to 10, and the ash content of the solution is not greater than 0.5% by weight, having undergone limited hydrolysis by a proteolytic enzyme;

(2) having molecules in the form of a plurality of micelles of irregular shape with a molecular weight of not less than 1,000,000 and a molecular size of 30 to 500 nm;

(3) being soluble in water and forming a milk-white solution; and (4) said micelles are associated together in a solution having a pH in the acid range of 3 to 6 to form insoluble aggregates.

2. Micellar whey protein as claimed in claim 1 wherein the limited hydrolysis by a proteolytic enzyme is carried out to such an extent that the degree of proteolysis is in the range of 0.01 to 50%.

3. Micellar whey protein as claimed in claim 1 wherein the heat treatment is carried out at a temperature of 60° to 150° C.

4. A micellar whey protein solution comprising a micellar whey protein dissolved in water, said micellar whey protein comprising the following properties:
   (1) being obtained by heat treatment of whey protein solution, wherein the whey protein is thermally undenatured, the pH of the solution is in the range of 6 to 10, and the ash content of the solution is not greater than 0.5% by weight, having undergone limited hydrolysis by a proteolytic enzyme;
   (2) having molecules in the form of a plurality of micelles of irregular shape with a molecular weight of not less than 1,000,000 and a molecular size of 30 to 500 nm;
   (3) being soluble in water and forming a milk-white solution; and
   (4) said micelles are associated together in a solution having a pH in the acid range of 3 to 6 to form insoluble aggregates.

5. A purified micellar whey protein solution obtained by purifying the micellar whey protein solution of claim 4 by means of a membrane having a fractionating molecular weight of not less than 5,000 Da.

6. A micellar whey protein powder obtained by drying the micellar whey protein solution of claim 4.

7. A micellar whey protein powder obtained by drying the purified micellar whey protein solution of claim 5.

8. A heat-sterilized whey-protein-containing liquid drink composition based on the micellar whey protein solution of claim 4 or the purified micellar whey protein solution of claim 5.

9. A whey-protein-containing powdered drink composition based on the micellar whey protein powder of claim 6 or 7.

10. A dairy product based on a whey protein coagulum obtained by adjusting the micellar whey protein solution of claim 4, the purified micellar whey protein solution of claim 5, or a reconstituted solution of the micellar whey protein powder of claim 6 or 7 to pH 3 to 6.

11. A dairy product based on a coagulum of whey protein obtained by adding a neutral salt to the micellar whey protein solution of claim 4, the purified micellar whey protein solution of claim 5, or a reconstituted solution of the micellar whey protein powder of claim 6 or 7.

12. A heated-processed or non-heat-processed food containing the micellar whey protein solution of claim 4, the purified micellar whey protein solution of claim 5, the micellar whey protein powder of claim 6 or 7, or a reconstituted solution of the micellar whey protein powder of claim 6 or 7, as a binder, extender, water dissociation-preventing agent, emulsion stabilizer or coagulant.

13. A micellar whey protein product comprising the following properties:
   (1) being obtained by heat treatment of whey protein solution, wherein the whey protein is thermally undenatured, the pH of the solution is in the range of 6 to 10, and the ash content of the solution is not greater than 0.5% by weight, having undergone limited hydrolysis by a proteolytic enzyme to such an extent that the degree of proteolysis is in the range of 0.01 to 50%;
   (2) having molecules in the form of a plurality of micelles of irregular shape with a molecular weight of not less than 1,000,000 and a molecular size of 30 to 500 nm;
   (3) being soluble in water and forming a milk-white solution; and
   (4) said micelles are associated together in a solution having a pH in the acid range of 3 to 6 to form insoluble aggregates.

* * * * *